C. L. POND.
Metallic-Seal.

No. 212,111.  Patented Feb. 11, 1879.

Chas. J. Buchheit
Edward J. Brady
Witnesses.

C. L. Pond, Inventor.
By Wilhelm & Bonner
Attorneys.

UNITED STATES PATENT OFFICE.

CHARLES L. POND, OF BUFFALO, NEW YORK.

IMPROVEMENT IN METALLIC SEALS.

Specification forming part of Letters Patent No. 212,111, dated February 11, 1879; application filed November 22, 1878.

*To all whom it may concern:*

Be it known that I, CHARLES L. POND, of the city of Buffalo, in the county of Erie, in the State of New York, have invented a new and useful Improvement in Metallic Seals, of which the following is a specification, reference being had to the accompanying drawings.

This invention relates to that class of seals which are made of soft metal and employed for sealing railway-cars, oyster and other tubs, and packages of various kinds, to prevent them from being entered and their contents abstracted by the persons engaged in their transportation.

In most metallic seals it is comparatively easy to draw one or both of the wires out of the seal without seriously defacing the seal, or so as to make it apparent that the seal has been tampered with, except upon close examination.

The object of my invention is to produce a metallic seal which will prevent the wires from being drawn out of the seal without severing them, or without defacing the seal to such an extent as to cause detection.

My invention consists, first, of a metallic seal composed of two parts, made in one piece of soft metal, and constructed to permit one of its parts or halves to be folded upon the other, so as to confine the twisted ends of the wire between them; also, in providing one of the parts or halves of the seal with a raised marginal flange adapted to be turned down over the folded part of the seal fitting within this flange, and finally in providing the flanged part or half of the seal with openings in its flat side or body, to permit the ends of the wire to be inserted, as will be hereinafter fully set forth.

Figure 1:
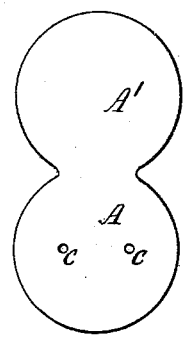
Figure 2:
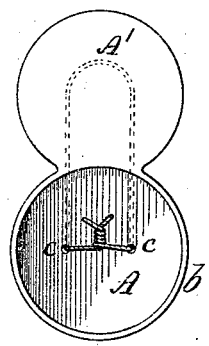
Figure 3:
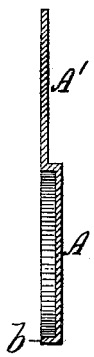
Figure 4:
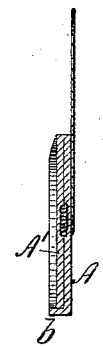
Figure 5:
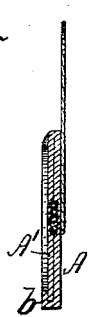
Figure 6:
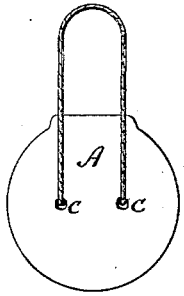

In the accompanying drawings, Figure 1 is a view of one of my improved seals constructed without the raised flange and unfolded. Fig. 2 is a similar view of a seal provided with a raised flange. Fig. 3 is a sectional view of the seal shown in Fig. 2. Fig. 4 is a similar view, showing the flat part of the seal folded down upon the flanged part. Fig. 5 is a similar view, showing the flange folded down upon the flat part. Fig. 6 is a rear view, and Fig. 7 a front view, of the complete seal.

Like letters of reference designate like parts in each of the figures.

A A' represent the two parts or halves of the seal formed in one piece, and each made substantially circular in form, and both connected together by a narrow strip of metal, which, owing to the flexibility of the metal, operates somewhat like a hinge in folding one part of the seal upon the other. As shown in Figs. 2, 3, 4, 5, and 7, the part A of the seal is provided with a raised flange, b, formed all around the margin of the part A, as clearly shown. c c are two openings formed in the part A of the seal for the insertion of the ends of the wire, which are secured together on the inner side of the part A by twisting.

Figure 7:
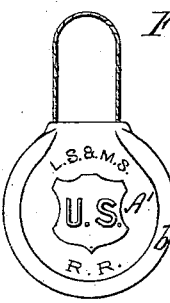

In using my improved seal, the ends of the wires may be inserted through the openings c c and secured together; or they may be passed around the narrow connecting-strip of metal and twisted together on the inner side of the seal, as may be preferred. The part A' is then folded down upon the part A, clamping the twisted ends of the wires between them. The seal-punch is then applied for closing the seal, and, when the flange b is used, for turning this flange down upon the part A', as shown in Figs. 5 and 7. The margin of the die of the seal-punch is preferably milled or otherwise engraved so as to produce a clear impression upon the flange b in folding it down.

It is clear that when my improved seal has been tightly closed by the punch the wires cannot be withdrawn from the seal by any means, even when the flange b is not used; but I prefer to use this flange, as it renders the opening of the seal utterly impossible without so defacing the seal as to render detection unavoidable.

My improved seals can be readily stamped with the flange b and holes c c complete at one operation, and the closing of the seal and folding of the flange are also readily accomplished by one compression between the dies of the seal-punch.

I claim as my invention—

1. A metallic seal composed of two similar disks, A A', made in one piece, of soft metal, and adapted to be secured together by folding and pressing one disk upon the other, whereby the ends of the wire are securely clamped between the two disks of the seal, substantially as set forth.

2. A metallic seal composed of two parts, A A', made in one piece, of soft metal, and adapted to be folded one upon the other, and having one of its parts provided with a raised marginal flange, b, adapted to be closed down upon the other half fitting within this flange, substantially as and for the purpose set forth.

3. A metallic seal composed of two parts, A A', made in one piece, of soft metal, and adapted to be folded one upon the other, and having one of its parts provided with a raised marginal flange, b, adapted to be folded down upon the other half, and having holes c c, for inserting the ends of the wire, substantially as and for the purpose set forth.

C. L. POND.

Witnesses:
 EDWARD WILHELM,
 CHAS. J. BUCHHEIT.